United States Patent
Barrow

[15] 3,668,628

[45] June 6, 1972

[54] MOTOR VEHICLE LIGHTING CONTROL AND EXTINGUISHING SYSTEM

[72] Inventor: Marvin A. Barrow, Houston, Tex.

[73] Assignees: Benjamin F. Byerly; Jack C. Watkins; Austin L. Potts; Lloyd Osburn; part interest to each

[22] Filed: Sept. 8, 1970

[21] Appl. No.: 70,299

[52] U.S. Cl. .................................340/52 D, 307/10 BP
[51] Int. Cl. ............................................B60q 1/00
[58] Field of Search ..........340/52 D; 307/10 LS, 142, 10 BP

[56] References Cited

UNITED STATES PATENTS

| | | |
|---|---|---|
| 3,337,786 | 8/1967 | Crews .................................307/10 BP |
| 3,467,831 | 9/1969 | Wilson et al. ......................307/10 BP |
| 828,090 | 8/1906 | Crane.................................307/10 LS |

Primary Examiner—John W. Caldwell
Assistant Examiner—Glen R. Swann, III
Attorney—Pravel, Wilson & Matthews

[57] ABSTRACT

Motor vehicle lighting control system for plural exterior vehicle lights which are selectively operable in accordance with the position of a light operation switch. The system extinguishes the vehicle's lights and returns the light operation switch to its unoperated position by suitable electromagnetic force means upon opening of the vehicle's ignition switch. An override feature allowing use of the lights with the ignition switch open is provided together with circuitry to give an indication that the override feature has been engaged.

8 Claims, 4 Drawing Figures

REMAINDER OF VEHICLE
ELECTRICAL SYSTEM
(CONVENTIONAL)

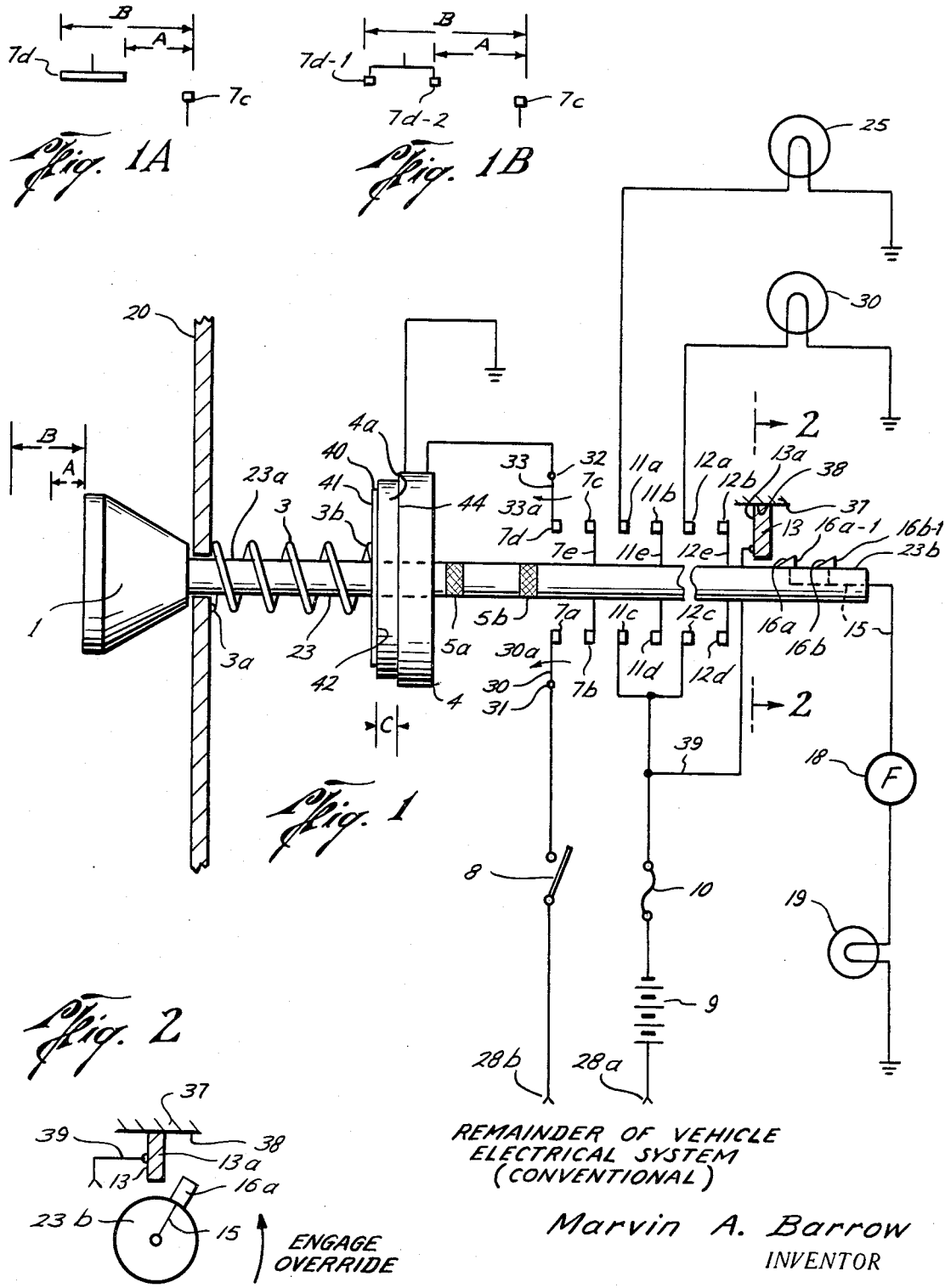

MOTOR VEHICLE LIGHTING CONTROL AND EXTINGUISHING SYSTEM

BACKGROUND OF THE INVENTION

1. Field of the Invention

The present invention relates to a new and improved motor vehicle lighting control system.

2. Description of the Prior Art improved

Systems which turn off the exterior lights of a motor vehicle should the user inadvertently disengage the ignition while the exterior lights of the vehicle are still burning are known in the prior art.

However, each of the prior art systems suffers certain deficiencies which the present invention overcomes. Certain prior art systems, such as that disclosed in U.S. Pat. No. 3,283,299 merely give an alarm to notify the user of the vehicle to extinguish the lights by operating the light switch.

Other prior art systems, such as that of U.S. Pat. No. 3,376,467, automatically extinguish the vehicle lights upon opening of the ignition switch of the vehicle. These systems suffer the disadvantage that when the automatic extinguisher system is in operation, the ignition switch must be closed for the exterior lights of the vehicle to operate.

Still other prior art systems, such as those in U.S. Pat. Nos. 3,341,736 and 3,389,296, also automatically extinguish the lights upon opening the ignition switch of the vehicle. These systems suffer the disadvantage that the light switch remains in a position indicating that the lights are burning after the automatic circuit has extinguished them upon opening of the ignition switch, thus creating unnecessary confusion as to whether the light circuit is defective, because the light switch indicates the lights should be burning, or confusion as to whether the automatic circuit has operated properly and caused the extinguishing of the lights, while leaving the switch in a position indicating the lights are operating.

Another prior art system, U.S. Pat. No. 3,145,322, solves the problem created by the uncertainty of the light switch being engaged after the automatic circuit has extinguished the lights by operating an alarm indicating that the light switch is still engaged after the lights have been automatically extinguished. However, this requires the user of the vehicle to interrupt his more important tasks to go the trouble of resetting the light switch to its non-operated position.

SUMMARY OF THE INVENTION

Briefly, the present invention comprises manually operated means for igniting the exterior lights of a motor vehicle, electromagnetic force means for holding said manually operated means in position while the ignition circuit of the vehicle is closed, and means for returning said manually operated means to its unoperated or rest position once the ignition circuit of the vehicle is opened. The invention also provides means to override the returning means and lock the actuating means so that the exterior lights remain burning regardless of the position of the ignition switch of the vehicle.

It is an object of this invention to provide a new and improved motor vehicle lighting control system.

It is an object of this invention to provide a motor vehicle lighting control system which will extinguish the exterior lights of the motor vehicle upon opening of the ignition circuit, while simultaneously adjusting the light control to indicate that the exterior lights are extinguished.

It is an object of this invention to provide a motor vehicle lighting control system wherein the exterior lights can be engaged while the ignition circuit is opened at the same time overriding the automatic extinguishing circuit.

BRIEF DESCRIPTION OF THE DRAWINGS

FIG. 1 is a view of the manual actuating switch of the present invention as attached to the dashboard of a motor vehicle and connected according to the present invention into the operating circuit for the vehicle's exterior lights.

FIGS. 1A and 1B are views of alternative structure usable in the switch of FIG. 1.

FIG. 2 is a cross-sectional view, taken along dotted line 2—2 of FIG. 1, showing the arrangement of the override feature of the present invention allowing burning of the exterior lights while the ignition switch of the vehicle is open.

DESCRIPTION OF THE PREFERRED EMBODIMENT

FIG. 1 illustrates the motor vehicle light control system of the present invention and includes a knob 1 fixedly secured to an end 23a of a rod 23 made of insulating material and extending into the cab of the vehicle through a dashboard 20, only part of which is shown. Knob 1 is a light control switch of the type currently used on motor vehicles and is well known in the art, and its rod 23 has been adapted as hereinafter set forth for the purposes of the present invention. Two conductive slugs 5a and 5b which serve as cores for an electromagnet 4 are circumferentially disposed around rod 23. Conductive contacts 7b, 7c, 11b, 11d, 12b and 12d are physically mounted with rod 23 by conductive members 7e, 11e and 12e, respectively. Contacts 7b and 7c, 11b and 11d, and 12b and 12d, respectively, are electrically connected to each other by the conductive members 7e, 11e and 12e, respectively.

The knob 1 can be situated in three positions: an original position, as illustrated in FIG. 1, wherein the knob 1 is adjacent the dashboard 20; a first position, reached when the knob 1 has been extracted a distance A from the dashboard 20; and a second position reached when the knob 1 has been extracted a distance B, representing the full length of travel of knob 1 and rod 23 from the dashboard 20. The distance A is preferably approximately ½ the distance B. The second position may be reached by extracting knob 1 from either the original position or the first position.

A pair of contacts, 7a and 7d, arranged to complete an electrical circuit when connected to the contacts 7b and 7c, respectively, are disposed the distance A from the contacts 7b and 7c, respectively, when the knob 1 is in the original position. Similarly, a pair of contacts, 11a and 11c, arranged to complete a circuit when connected to the contacts, 11b and 11d, respectively, are disposed the distance A from the contacts 11b and 11d, respectively, when the knob 1 is in the original position.

A pair of contacts 12a and 12c, arranged to complete an electrical circuit when connected to the contacts 12b and 12d, respectively, are disposed the distance B from the contacts 12b and 12d, respectively, when the knob 1 is in the original position.

The contacts 7a and 7b and the contacts 7c and 7d are designed to connect when the knob 1 is in the first position and when the knob 1 is in the second position. I have found that this can be accomplished in several ways. First, the contacts 7a and 7d could each be attached to one of a pair of movable arms 30 and 33, respectively. The movable arms 30 and 33 are arranged so as to move in the direction indicated by a pair of arrows 30a and 33a once the contacts 7a and 7d have been engaged respectively by the contacts 7b and 7c. Contacts 7a and 7d would then connect to contacts 7b and 7c, respectively, when knob 1 has been extracted the distance A to the first position. The movable arms 30 and 33 would rotate about one of a pair of points 31 and 32, respectively, in the direction of the arrows 30a and 33a as knob 1 is further extracted to the second position. Alternatively, the contacts 7a and 7d could be designed to be long enough to maintain continuous connection with the contacts 7b and 7c while knob 1 is being extracted the distance from the first position to the second position, as illustrated by the contacts 7d and 7c in FIG. 1a. Still further, the contacts 7d and 7 a could each be designed to be two separate contacts 7d-1 and 7d-2 and 7a-1 and 7a-2, respectively, so that connection with contacts 7c and 7b, respectively, is made when knob 1 is in the first position and when knob 1 is in the second position, as illustrated in FIG. 1b.

When knob 1 has been extracted from the original position adjacent the dashboard 20 the distance A to the first position, the conductive slug 5a is situated within the electromagnet 4 while the contacts 7a and 7b, 7c and 7d, 11a and 11b, 11c and 11d are connected, respectively. The contacts 12a through 12d are not connected.

When knob 1 has been extracted from the original position adjacent the dashboard 20 the distance B to the second position, either as a one stage movement directly from the original position, or the second stage of a two stage movement, the first stage being a movement from the original position the distance A to the first position, and the second stage being a movement from the first position to the second position, the conductive slug 5b is situated within the electromagnet 4, while the contacts 7a and 7b, 7c and 7d, 12a and 12b, 12c and 12d are connected, respectively. The contacts 11a through 11d are not connected.

A permanent magnet 4a may be situated adjacent electromagnet 4 to assist electromagnet 4 by exerting an additional force on whichever of the slugs 5a or 5b is situated within the electromagnet 4. Use of the permanent magnet 4a is not essential for the purposes of the present invention, as electromagnet 4 can be designed to provide sufficient counteracting force in a manner to be set forth hereinafter, but permanent magnet 4a does reduce the amount of force required to be exerted by electromagnet 4 on the slugs 5a and 5b, thereby correspondingly reducing both the size of electromagnet 4 and the power consumption of electromagnet 4.

A spring 3 is positioned between dashboard 20 and a flat washer 40 circumferentially enclosing an end 23a or rod 23. Spring 3 is fixedly attached at an end 3a to dashboard 20, while an end 3b opposite the end 3a rides on a smooth surface 41 of the washer 40. The rod 23 is fixedly attached to the washer 40 along the surface of washer 40 through which such rod passes thereby transmitting any force exerted by spring 3 when spring 3 is compressed through washer 40 to rod 23.

Although washer 40 is illustrated as contacting permanent magnet 4a along a surface 42, this is not mandatory for the purposes of the present invention, as washer 40 could be located along end 23a of rod 23 between dashboard 20 and permanent magnet 4a so long as end 3a of uncompressed spring 3 contacts dashboard 20 and end 3b of spring 3 contacts washer 40 when knob 1 is in the original position. It should also be noted that if permanent magnet 4a is not utilized, a longer spring 3 could be used so that washer 40 would contact electromagnet 4 along a surface 44 when spring 3 is in its unengaged position, or alternatively the spring 3 illustrated in FIG. 1 could be utilized, whereby washer 40 would be separated from electromagnet 4 by a distance C illustrated in FIG. 1.

When knob 1 and rod 23 are in the original position, spring 3 is preferably in an uncompressed position, exerting no force against washer 40 and rod 23, thereby permitting extraction of knob 1 to either the first or second position with minimum exertion. However, spring 3 could also be slightly compressed when knob 1 is in the original position thereby holding knob 1 securely in the original position against dashboard 20.

When knob 1 is extracted to the first position, spring 3 is partially compressed between dashboard 20 and washer 40, and the force stored in partially compressed spring 3, if unopposed by counteracting forces as set for hereinafter, tends to restore knob 1 to the original position through pressure passed from such partially compressed spring through washer 40 to rod 23.

When knob 1 is extracted to the second position, spring 3 is more fully compressed between dashboard 20 and washer 40 and the force stored in compressed spring 3, if unopposed by counteracting forces to be set forth hereinafter, tends to restore knob 1 to the original position through pressure passed from compressed spring 3 through washer 40 to rod 23.

Electromagnet 4 when energized by the flow of current as hereinafter set forth operates an electromagnetic force attracting slug 5a and holding such slug 5a inside electromagnet 4 when knob 1 is in the first position, and slug 5b and holding such slug 5b inside electromagnet 4 when knob 1 is in the second position, with sufficient intensity to counteract the force exerted by compressed spring 3 thereby maintaining knob 1 in the first or second position to which it has been extracted. As set forth hereinafter, permanent magnet 4a can be utilized to assist electromagnet 4 in attracting slugs 5a and 5b, thereby reducing the force required of electromagnet 4 with corresponding reductions in size and power consumption of electromagnet 4.

A pair of conductive ratchets 16a and 16b, are mounted at an end 23b of the rod 23 to the rod 23, which conductive ratchets are connected by an electrical conductor 15 positioned in the end 23b of the rod 23 extending out of the end 23b of insulating rod 23 to a flasher 18 electrically connected to an indicator lamp 19 and to ground. The ratchet 16a is situated on the rod end 23b so that after rod end 23b has been extracted the distance A to the first position, the ratchet 16a is engageable with a conductive pawl 13 in a manner to be set forth hereinafter, while the ratchet 16b is situated on the rod end 23b so such ratchet 16b is engageable with the conductive pawl 13 after rod end 23b has been extracted the distance B to the second position. The conductive pawl 13 is attached at an insulated surface 38 to a suitable location 37 of the motor vehicle.

A vehicle battery 9 is electrically connected at its negative terminal through a protective fuse 10 to the contact 11c and the contact 12c and through a suitable electric conductor 39 to conductive pawl 13. The battery 9 is electrically connected at its positive terminal through a terminal 28a to the remainder of the vehicle's electrical system. Since the remainder of the electrical system is conventional, for example of the type set forth on page 15–112, "Standard Handbook for Mechanical Engineers," Baumeister and Marks, McGraw-Hill, Seventh Edition, 1966, and not related to the subject matter of the present invention, it has not been depicted in the drawings in order to preserve clarity in the drawings.

A terminal 28b is connected to a suitable electrical connection located in the remainder of the vehicle's electrical system and passes current to one terminal of a contact 8 which is operated by the vehicle ignition switch. The contact 8 is open when the vehicle ignition switch is in an off position, and is closed when the vehicle ignition switch is in an on position. Since the ignition switch of a motor vehicle is well known in the art, it has been omitted from the drawings to preserve clarity. The other terminal of the contact 8 is electrically connected to the contact 7a, and the contact 7d is connected to the electromagnet 4 and from the electromagnet 4 to the ground.

A lamp 25, symbolically indicating the parking lights and tail lights of the motor vehicle, electrically connected between the contact 11a and the ground, receives current whenever knob 1 is in the first position from the battery 9 through the fuse 10, the contact 11c, the contact 11d, the conductive member 11e, the contact 11b and the contact 11a when the knob 1 is in the first position.

A lamp 30, symbolically indicating the headlights and tail lights of the motor vehicle, electrically connected between the contact 12a and ground, receives current whenever knob 2 is in the second position from the battery 9 through the fuse, the contact 12c, the contact 12d, the conductive member 12e, the contact 12b, and the contact 12a, which current then passes through the lamp 30 to ground.

The electromagnet 4, whenever the ignition switch and contact 8 are closed and the knob 1 is in either the first or the second position, receives current from the battery 9 through the terminal 28a, the undepicted remainder of the vehicle's electrical system, the terminal 28b, the closed contact 8, the contact 7a, the contact 7b, the conductive member 7e, the contact 7c and the contact 7d, which current then passes through the electromagnet 4 to ground.

It should be noted at this point that the contacts 7a through 7d and the conductive member 7e are not essential to the operation of the present invention, and that the ignition switch 8 could be electrically connected directly to the electromagnet 4, thus eliminating the contacts 7a through 7d and the conductive member 7e. However, inclusion of the contacts 7a through 7d and the conductive member 7e does offer the advantage of lessening power consumption by the electromagnet 4, since the electromagnet 4 does not draw current until the knob 1 has been moved to either the first or second position to engage the present invention in operation as will be set forth hereinafter. A further advantage possible by inclusion of contacts 7a through 7d and conductive member 7e is that possible overheating of the electromagnet 4, caused by flow of current through the electromagnet 4 for long periods of time, is less likely to occur.

Knob 1 and attached rod 23 are rotatable to control the intensity of the vehicle's interior lights and when rotated to one extreme engage to light in the dome of the interior as is standard on most recently produced vehicles, and well known in the art. Since this feature is well known in the art, it has been omitted from the drawings to preserve clarity in the drawings, with reference to this feature being made by the indicative arrow pointing in the direction of clockwise rotation. Spring 3 does not interfere with rotation of knob 1 and rod 23 since its end 3b will ride on the smooth surface 41 of washer 40.

FIG. 2 illustrates rod 23 rotated to a position so that the conductive ratchet 16a does not engage the conductive pawl 13 when knob 1 is in the first position.

Rotation of knob 1 and rod 23 counterclockwise when knob 1 is in the first position to a point where conductive pawl 13 and conductive ratchet 16a are in radial alignment and thus a surface 16a-1 and surface 13a are engaged, allows knob 1 and rod 23 to remain in the first position by overcoming the force exerted by partially compressed spring 3 through the washer 40 to end 23a of rod 23, because the mechanical engagement between surface 16a-1 of conductive ratchet 16a and surface 13a of conductive pawl 13 counteracts the force exerted by spring 3 which would otherwise return knob 1 to the original position. Further counterclockwise rotation of knob 1 and rod 23 causes ratchet 16 to become disengaged from pawl 13, and spring 3 will now return knob 1 and rod 23 to the original position from the first position.

Indicator lamp 19 is intermittently energized over the following electrical circuit: battery 9, fuse 10, conductor 39, conductive pawl 13, conductive ratchet 16a, conductor 15, flasher 18, indicator lamp 19, and ground. The flasher 18, in the well known manner, alternately opens and closes the above set forth circuit, thereby causing lamp 19 to "blink" on and off.

Similarly, a surface 16b-1 of ratchet 16b can be caused to engage surface 13a of pawl 13 when knob 1 is in the second position by counterclockwise rotation of knob 1 and rod 23, thereby counteracting the force exerted by compressed spring 3, which again would if unopposed return knob 1 to the original position. Indicator lamp would also again be intermittently energized when ratchet 16b engages pawl 13 over circuit from battery 9, fuse 10, conductor 39, conductive pawl 13, conductive ratchet 16b, conductor 15, flasher 18, indicator lamp 19, ground, thereby causing lamp 19 to blink. Ratchet 16b would also be disengaged from pawl 13 by further rotation of knob 1 and rod 23 past the position wherein ratchet 16b and conductive pawl 13 are in radial alignment, thereby allowing spring 3 to return knob 1 and rod 23 from the second position to the original position.

In the operation of the present invention, the user of the vehicle after closing contact 8 actuates the parking lights by extracting knob 1 to the first position. As set forth hereinabove, when knob 1 is in the first position and contact 8 is closed, passage of current from battery 9 through electromagnet 4 creates a sufficient electromagnet force on slug 5a to oppose and counteract the force exerted by partially compressed spring 3, thereby allowing knob 1, to remain in the first position and permitting current to pass from battery 9 through contact 11c, contact 11d, conductive member 11e, contact 11b, contact 11a to energize the parking lights symbolically indicated at 25. Should the user stop the motor and leave the vehicle having inadvertently left the parking lights engaged, the opening of ignition switch, and contact 8, causes the flow of current energizing electromagnet 4 to cease, thereby allowing the force of partially compressed spring 3, now unopposed, to return knob 1 to the original position which by opening contacts 11c and 11d together with contacts 11a and 11b prevents the parking lights from draining excess current from battery 9 while the vehicle is not being used.

In a similar manner, if the user after closing contact 8 actuates the headlights and tail lights by extracting knob 1 to the second position, current through electromagnet 4 generates an electromagnetic force on slug 5b opposing and counteracting the force exerted by compressed spring 3 allowing knob 1 to remain in the second position, thereby permitting current to pass from battery 9 through contacts 12c and 12d, conductive member 12e, contacts 12a and 12b, to energize the headlights and tail lights symbolically indicated at 30. Should the user stop the motor and leave the vehicle having inadvertently left the headlights engaged, the opening of ignition switch and contact 8 causes the flow of current energizing electromagnet 4 to cease, thereby allowing the force of compressed spring 3, now unopposed, to return knob 1 to the original position, which by opening contacts 12a and 12b as well as 12c and 12d prevents the headlights from draining excess current from battery 9 while the vehicle is not being used.

It is often desirable to engage the vehicle's lights while the ignition switch is open, for instance, when opening the trunk to remove a spare tire while changing a flat tire at night. The lights must be engaged for safety and visibility purposes, but the keys must be removed from the ignition in order to operate the trunk latch of the vehicle. The override feature of the present invention will allow this desirable operation. To engage the parking lights of the vehicle by means of the override feature of the present invention, knob 1 is extracted to the first position, and knob 1 and rod 23 are rotated counterclockwise to a position where conductive ratchet 16a engages conductive pawl 13 by coming into radial alignment with pawl 13. The mechanical connection between ratchet 16 and pawl 13 prevents spring 3 from returning knob 1 to a position adjacent dashboard 20. Since knob 1 and spring 3 are thus mechanically restrained in the first position, lights 25 receives current from battery 9 through contacts 11a – 11d and fuse 10 regardless of whether contact 8 is supplying current to electromagnet 4 to electrically restrain knob 1 and spring 3. As a warning feature to prevent the user from leaving the vehicle with its parking lights engaged by the override feature, a light 19, visible to the user, is made to flash by flasher 18 to indicate that the override feature is in use. The following circuit supplies current to lamp 19: battery 9, fuse 10, conductive pawl 13, conductive ratchet 16a, flasher 18, lamp 19, ground.

In order to engage the headlights 30 by means of the override feature of the present invention, knob 1 is extracted to the second position, and ratchet 16b is thus disposed inside circular conductive pawl 13. As set forth hereinabove, rotation of knob 1 and rod 23 counterclockwise will allow ratchet 16b to form a mechanical connection with pawl 13 by coming into radial alignment with pawl 13, thus mechanically restraining knob 1 in its second position so as to override the force exerted by spring 3, while the warning feature of flashing light 19 is also engaged. The headlights, symbolically depicted at 30, receive current by the circuit from battery 9, fuse 10, contact 12c, contact 12d, conductive member 12e, contact 12b and contact 12a, which current passes through the lights to ground.

To disengage the override feature of the present invention, knob 1 and rod 23 are rotated slightly past the position where either of ratchets 16 engages pawl 13, counterclockwise in the embodiment depicted in FIG. 2. This prevents mechanical connection between ratchet 16 and pawl 13, and spring 3 is now unopposed. The force exerted by spring 3 now return knob 1 from either its first or second position to its original position adjacent dashboard 20 thus breaking the electrical contacts which had been feeding current to whichever of the sets of lights had been in use.

Although a specific embodiment has been hereinabove set forth, numerous variations will become apparent to those of ordinary skill in the art, particularly in order to adapt the present invention to the lighting system of different models of motor vehicles. For example, currently produced automobiles have their parking lights also engaged at any time their headlights are engaged. The present invention can be utilized on automobiles with this feature by merely including the parking lights and the headlights of such vehicle in the electrical circuit between contact 12a and ground at the position symbolically indicated by lamp 30.

The foregoing disclosure and description of the invention are illustrative and explanatory thereof, and various changes in the size, shape, and materials as well as in the details of the illustrated construction may be made without departing from the spirit of the invention.

What is claimed is:

1. A motor vehicle lighting control system to prevent the user of the vehicle inadvertently leaving the vehicle with the lights engaged, including:
   a. plural exterior vehicle lights;
   b. manually actuated means having a plurality of operated positions for engaging said vehicle lights, said manually actuated means including means for selectively engaging different ones of said vehicle lights, in accordance with the operated position of said manually actuated means;
   c. means for returning said manually actuated means to its rest position thereby extinguishing said vehicle lights;
   d. electromagnetic force means for counteracting said returning means when energized, said electromagnetic force means allowing said returning means to operate when said electromagnetic force means is de-energized; and
   e. switch means for closing a circuit to energize said electromagnetic force means when said manually actuated means has been operated.

2. The structure of claim 1, including:
   a. conductive means disposed on said manually actuated means and;
   b. said electromagnetic force means acting upon said conductive means to counteract the force exerted by said returning means.

3. The structure of claim 2, wherein said electromagnetic force means includes:
   a. permanent magnet means to exert additional force on said conductive means, thereby assisting said electromagnetic force means in counteracting the force exerted by said returning means.

4. The structure of claim 1, including:
   a. rotatably engageable means for locking said manually actuated means in a position engaging said vehicle lights.

5. The structure of claim 4, including:
   a. means for giving an alarm indicating that said rotatably engageable means has locked said manually actuated means in a position engaging said vehicle lights.

6. The structure of claim 1, including:
   a. conductive means disposed on said manually operated means;
   b. said electromagnetic force means acting upon said conductive means to counteract the force exerted by said returning means; and
   c. rotatably engageable means for locking said manually actuated means in a position engaging said vehicle lights.

7. The structure of claim 6, including:
   a. means for giving an alarm indicating that said rotatably engageable means has locked said manually actuated means in a position engaging said vehicle lights.

8. The structure of claim 7, wherein said electromagnetic force means includes:
   a. permanent magnet means to exert additional force on said conductive means, thereby assisting said electromagnetic force means in counteracting the force exerted by said returning means.

* * * * *